United States Patent
Suomi et al.

[11] Patent Number: 5,809,066
[45] Date of Patent: Sep. 15, 1998

[54] ERROR CORRECTION PROTOCOL OF THE NETWORK BETWEEN A RADIO DATA TERMINAL MODEM AND A REMOTE DATA MODEM USING NEGOTIATED COMPRESSION PARAMETERS

[75] Inventors: Arto Suomi; Mikko Terho, both of Tampere, Finland

[73] Assignee: Nokia Telecommunications Oy, Espoo, Finland

[21] Appl. No.: 211,762

[22] PCT Filed: Aug. 16, 1993

[86] PCT No.: PCT/FI93/00322

§ 371 Date: Apr. 15, 1994

§ 102(e) Date: Apr. 15, 1994

[87] PCT Pub. No.: WO94/05104

PCT Pub. Date: Mar. 3, 1994

[30] Foreign Application Priority Data

Aug. 17, 1992 [FI] Finland ..................................... 923682

[51] Int. Cl.⁶ ................................. H04B 1/38; H04B 1/66
[52] U.S. Cl. ........................... 375/222; 455/422; 455/557
[58] Field of Search ...................................... 375/349, 220, 375/221, 222, 219, 249, 250, 356, 240; 371/35, 2.1; 333/14; 379/58, 59.62, 93, 97, 98, 100, 61, 63; 455/33.1, 34.1, 34.2, 33.2, 63, 31.1, 72, 422, 426, 466, 423, 557; 370/109, 521; 395/612, 114, 2.91, 2.94, 888; 358/426, 430; 325/240

[56] References Cited

U.S. PATENT DOCUMENTS

| | | |
|---|---|---|
| 34,034 | 8/1861 | O'Sullivan . |
| 4,675,863 | 6/1987 | Paneth et al. .............................. 370/50 |
| 4,748,638 | 5/1988 | Friedman et al. . |
| 4,803,726 | 2/1989 | Levine et al. .............................. 380/48 |
| 4,887,265 | 12/1989 | Felix . |
| 4,926,448 | 5/1990 | Kraul et al. .............................. 375/377 |
| 4,974,099 | 11/1990 | Lin et al. .............................. 358/426 |
| 5,010,553 | 4/1991 | Scheller et al. ............................ 371/35 |
| 5,072,308 | 12/1991 | Lin et al. ................................ 358/426 |
| 5,111,454 | 5/1992 | Hung et al. . |
| 5,117,453 | 5/1992 | Piasecki et al. . |
| 5,127,048 | 6/1992 | Press et al. ............................. 379/100 |

FOREIGN PATENT DOCUMENTS

WOA1 9118483 11/1991 WIPO .

OTHER PUBLICATIONS

Newton, Newton's Telecom Dictionary, pp. 1102–1103, Jul. 1994.

*Primary Examiner*—Chi H. Pham
*Assistant Examiner*—William Luther
*Attorney, Agent, or Firm*—IP Group of Pillsbury Madison & Sutro LLP

[57] ABSTRACT

An arrangement for enhancing data transmission in a digital cellular radio network, including a radio data terminal (A), a network terminating unit (IWF) connected to a mobile exchange (MSC) and including a data modem (MOD1), and a remote data modem (MOD2). The radio data terminal (A) and the remote data modem (MOD2) include features for providing data compression and decompression. The digital transmission connection between the radio data terminal (A) and the data modem (MOD1) is a non-transparent asynchronous data connection of a cellular radio system, over which compressed data is transmitted using the error correction of the cellular system. The error correction protocol of the remote modem is used for the transmission of compressed data over the modem connection between the data modem (MOD1) and the remote data modem (MOD2). At the beginning of a data session the data modem transmits compression parameters to the radio data terminal; these parameters are determined on the basis of a handshaking procedure between the data modem and the remote data modem.

15 Claims, 3 Drawing Sheets

Fig. 1 (PRIOR ART)
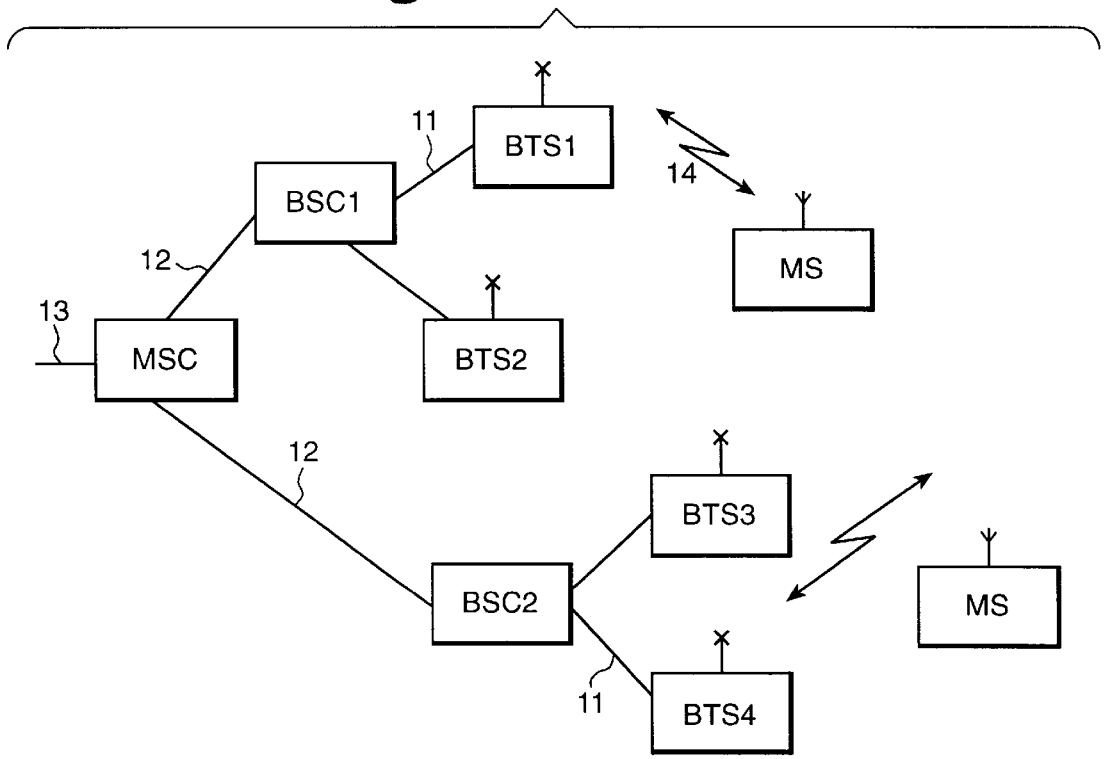
Fig. 2
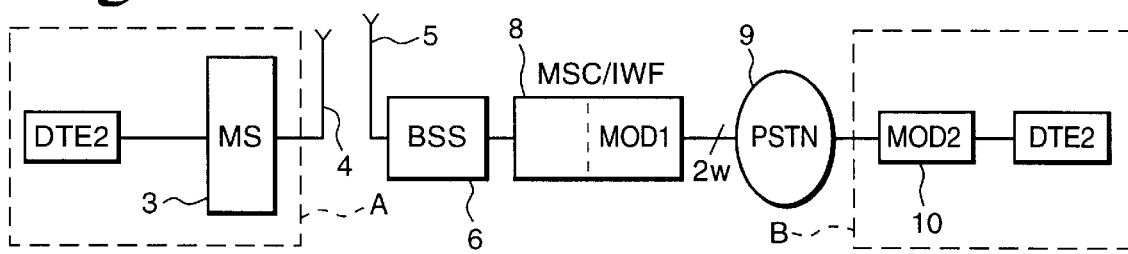
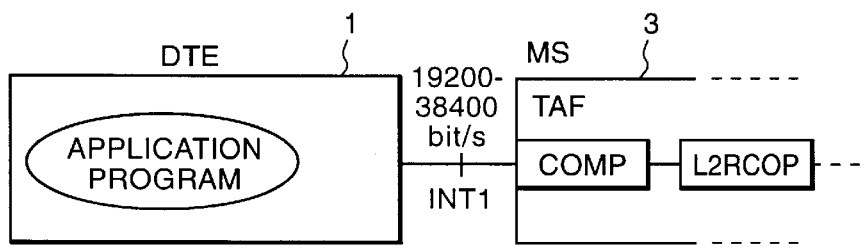
Fig. 3A
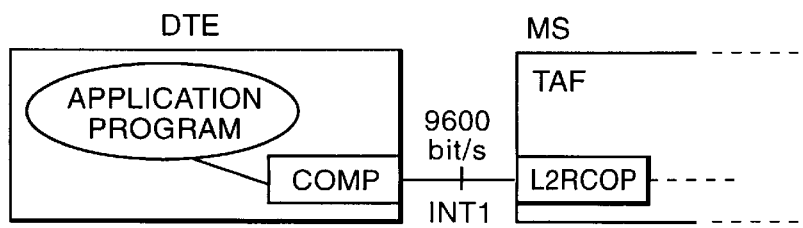
Fig. 3B

ERROR CORRECTION PROTOCOL OF THE NETWORK BETWEEN A RADIO DATA TERMINAL MODEM AND A REMOTE DATA MODEM USING NEGOTIATED COMPRESSION PARAMETERS

FIELD OF THE INVENTION

The invention relates to an arrangement for enhancing data transmission in a digital cellular radio network.

BACKGROUND OF THE INVENTION

In the European mobile telephone system GSM, it is possible to establish a circuit switched data transmission connection or traffic channels so as to enable a data terminal connected to the data interface of a mobile radio unit to transfer data to and from a data modem in a mobile exchange and further by means of a modem link to and from another data modem and a data terminal connected to it. The maximum transmission rate of such data transmission is determined by the maximum capacity of the data channel established over the radio path, e.g. 9600 bit/s in the GSM system. In many applications there exists, however, a need for considerably higher transmission rates of user data.

SUMMARY OF THE INVENTION

An object of the present invention is to enhance data transmission in a digital cellular radio network.

According to the invention, an arrangement is provided for enhancing data transmission in a digital cellular radio network. This arrangement includes a radio data terminal; a network terminating unit connected to a mobile exchange and comprising a data modem; a remote data modem; and call control means for establishing a digital transmission connection between the radio data terminal and the data modem and a modem connection between the data modem and the remote data modem. The radio data terminal and the remote data modem comprise means for transmitting data in a compressed form, the digital transmission connection between the mobile radio data terminal and the data modem is a non-transparent asynchronous data connection of a cellular radio system, over which connection the compressed data is transmitted using the error correction of the cellular system, and the data modem of the network terminating unit comprises means for transmitting compressed data over the modem connection by using the error correction protocol of the remote modem and for transmitting compression parameters to the radio data terminal at the beginning of a data session, the parameters being determined on the basis of a handshaking procedure between the data modem and the remote data modem.

According to the invention, user data is transmitted between a radio data terminal and a remote data modem in a compressed form, whereby any possible redundancy has been removed from the data stream, and thus the amount of data to be transmitted over the radio link is reduced. The typical maximum compression ratios obtained by compression algorithms are 2:1 or 4:1, which allows a user data stream of up to 19200/38400 bit/s to be sent along and received from a data channel of 9600 bit/s in a cellular radio system. The actual compression ratios achieved by the compression algorithms are, however, highly dependent on the type of user data.

The transmission of compressed data requires a completely error-free transmission channel, as even a minor transmission error corrupts the decompression algorithm at the reception end. It is therefore necessary to use as efficient error correction as possible over the entire transmission connection in order to prevent transmission errors. An obvious solution is to use, in addition to compression, the same error correction algorithm in the radio data terminal as in the remote data modem of the other end, whereby the intermediate transmission connection would only be a transparent "tube" through the radio path. However, the error correction uses the transmission capacity to some extent, wherefore the maximum capacity of the data channel over the radio path cannot be utilized solely for the transmission of user data.

According to the invention, this is solved so that the digital transmission connection over the radio path between a mobile radio data terminal and a data modem in a network terminating unit is a non-transparent asynchronous transmission connection, where the error correction protocol of the radio system, optimized for correcting errors in the radio link, can thus be employed automatically. Because the error correction of the radio system does not use the capacity of the data channel, the invention allows the entire transmission capacity to be used for the transmission of compressed user data between a radio terminal equipment and a data modem in a network terminating unit. According to the invention, the error correction required over the modem connection is achieved by utilizing identical error correction protocols in the data modem of the network terminating unit and in the remote data modem at the other end of the modem connection. In the invention, the compression functions are thus distributed to the radio data terminal and the error correction of the modem connection to the data modem, which in no way participates in the compression. At the beginning of the modem connection, however, the data modem negotiates the compression parameters to be used in the data transmission by means of handshaking with the remote data modem, and transmits them to the radio data terminal.

BRIEF DESCRIPTION OF THE DRAWINGS

The invention will be described in more detail by means of illustrative embodiments with reference to the accompanying drawings, in which FIG. 1 is a block diagram which illustrates the structure of a cellular radio system, FIG. 2 is a block diagram which illustrates a system configuration for data transmission according to the invention, FIGS. 3A and 3B illustrate the disposition of the compression function in a mobile station and correspondingly in terminal equipment.

DETAILED DESCRIPTION OF A PREFERRED EMBODIMENT OF THE INVENTION

Figure 4:
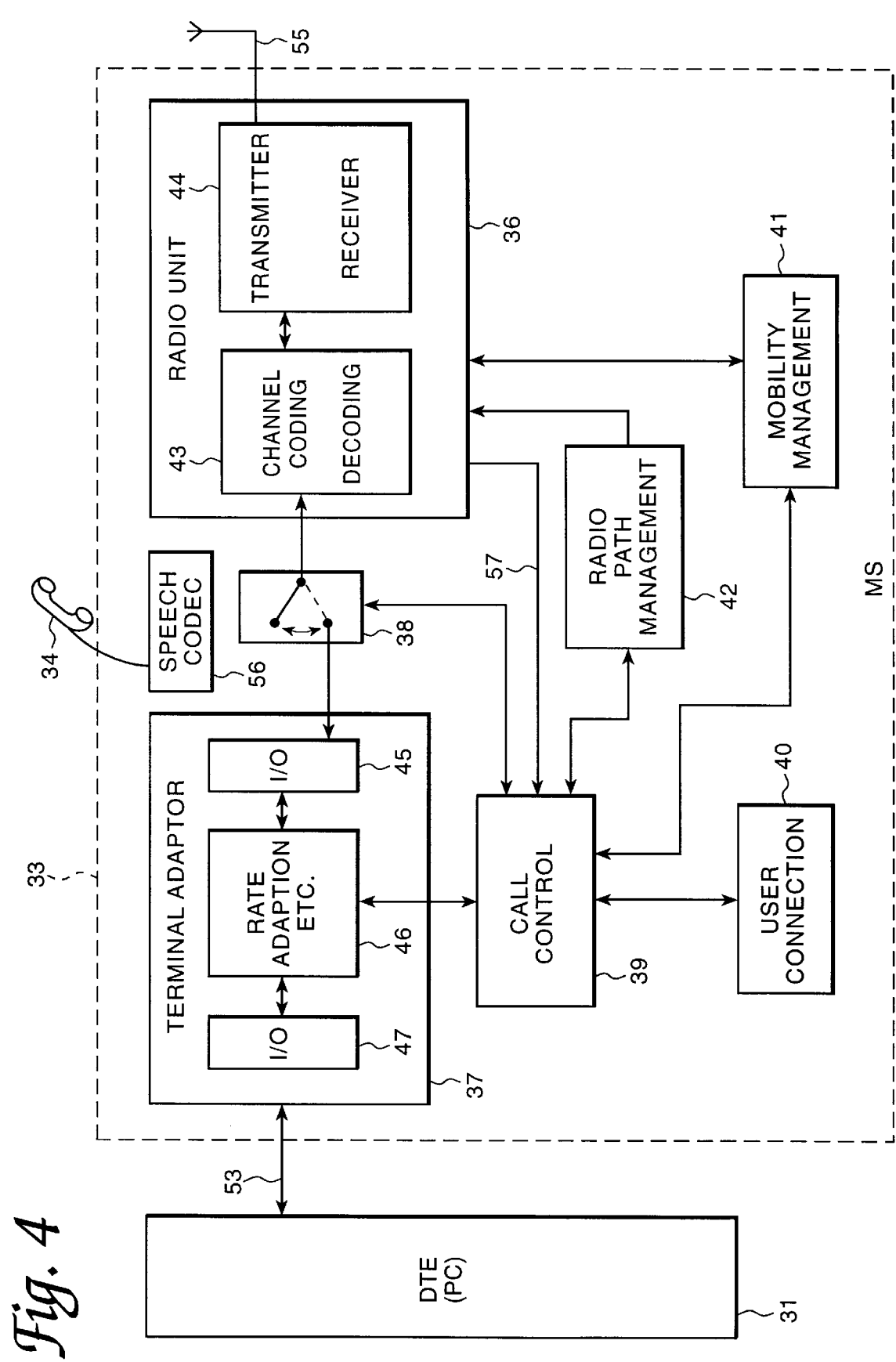
FIG. 4 is a block diagram which illustrates a mobile station and a connection of a data terminal thereto.

The arrangement according to the present invention for implementing a facsimile service is applicable to any digital cellular radio system. It is particularly suitable for use in the European digital mobile telephone system GSM and corresponding digital systems, such as DCS1800 and PCN (Personal Communication Network). In the following, the preferred embodiment of the invention will be described in connection with the GSM system; it is, however, not restricted to this system.

FIG. 1 is a schematic view of part of the GSM cellular radio system. In a cellular radio system the area covered by the system is divided into radio cells. Two base station controllers BSC1 and BSC2 are connected to a mobile exchange MSC by digital transmission connections 12. Base stations BTS1, BTS2 and, correspondingly, BTS3 and BTS4 are further connected to the base station controllers BSC1 and BSC2 by digital transmission connections 11. Each BSC and the base stations associated with it form a base station system BSS. Typically, the radio coverage area of a base station BTS forms a radio cell. Each base station BTG1-BTS4 has a predetermined number of physical radio channels. A signal (physical channel) of the GSM system consists of TDMA frames, each of which contains preferably eight time slots by means of which logical channels are transmitted. The logical channels contain traffic channels for calls (voice and data) to be set up with mobile stations MS located within the cell, and control channels for signalling performed with the mobile stations located within the cell. Over the traffic channels, it is possible to establish a speech connection, a V.110 rate-adjusted 64 kbit/s full-duplex data connection or a 9.6/4.8/2.4 kbit/s data connection. Special purpose adaptors are typically required at both ends of the data connection for adapting the data connection to terminal equipment and/or other transmission connections/systems. The adaptor connected to terminal equipment is usually called a terminal adaptor, and the adaptor at the network end a network terminating unit. In the GSM mobile phone system, such a network terminating unit is located in a mobile exchange MSC.

FIG. 2 shows a data transmission arrangement in which radio terminal equipment A consists of a mobile station 3 (MS) and data terminal equipment DTE1 connected thereto. A data connection as described above is established on a logical traffic channel from the radio terminal equipment A to a mobile exchange 8 (MSC) by means of the radio link between the mobile station MS and the base station system 6 (BSS). The network adaptor IWF in the mobile exchange MSC comprises a data modem MOD1. The line interface (modem interface) of the modem is connected to a conventional 2-wire line (2 w), which in the example is connected through a public switched telephone network 9 (PSTN) to a remote modem 10, which, in turn, is connected to another remote terminal equipment B comprising a remote modem 10 (MOD2) and a data terminal DTE2 connected thereto. The data modem MOD of the network terminating unit and the remote data modem 10 signal in the normal manner over the modem connection established between them. The data terminal equipment DTE1 controls the operation of the data modem MOD1 over the GSM data connection, transmits data to the data modem MOD1, and correspondingly receives it. Normally, the bottle-neck of the end-to-end data connection between radio terminal equipment A and remote terminal equipment B is the GSM data connection, the maximum transmission rate of which is typically 9600 bit/s.

In the present invention, the data transmission is enhanced by providing the terminal equipment A and B with data compression and decompression, and by transmitting data over an end-to-end link A-B in a compressed form. The transmission of compressed data is very sensitive to transmission errors, and therefore it is absolutely necessary to have error correction. Conventional compressing modems connected to a public switched telephone network PSTN automatically comprise error correction. The remote terminal equipment B can thus be implemented with normal commercial equipment comprising data compression and error correction, e.g. in accordance with CCITT Recommendation V.42bis. When the GSM data connection is established as a so-called transparent data connection and the radio terminal equipment A is provided with a similar data compression and error correction as the terminal equipment B, the entire data connection is provided with data compression and error correction. In this case, however, the error correction uses part of the transmission capacity of the GSM data connection and reduces thus the advantage gained by compression. Moreover, the error correction employed is not necessarily suitable in the best possible manner for the correction of errors occurring over the radio path. Such configuration further requires an end-to-end synchronous connection, wherefore the GSM connection must also be synchronous, and the radio terminal equipment A should be designed for such synchronous transmission. However, both the present subscriber terminals and those under development for cellular radio networks support primarily asynchronous data transmission solutions.

In the present invention, this is solved by distributing the functions in such a manner that data compression and decompression are performed in the radio terminal equipment A, and the error correction required for the modem connection is performed in the data modem MOD1 of the network terminating unit. The transmission connection between the radio terminal equipment A and the data modem MOD1 of the network terminating unit is thus a so-called non-transparent asynchronous GSM data connection over which compressed data is transmitted using the error correction of the GSM system, the error correction being optimized for the radio path. The error encoding of the GSM system does not use the capacity of the GSM data connection, and therefore the entire capacity of the channel can be used for the transmission of compressed user data.

The error correction in the data modem MOD1 of the network terminating unit corresponds to the error correction in the remote data modem MOD2 and performs error correction for the modem connection. The modem MOD1 does not participate in the actual data compression in any way. By means of handshaking performed at the beginning of the modem session, the modems MOD1 and MOD2 agree with each other on the compression parameters to be used during the data session. The modem MOD1 transmits these compression parameters over the GSM data connection to the compression algorithm of the radio terminal equipment A.

The compression/decompression function can be disposed in several different ways in the radio terminal equipment A. In FIG. 3A, the compression/decompression is performed in the terminal adaption function TAF of a mobile station MS, between the DTE interface INT1 and RLP (radio link protocol) and the rate adaption functions L2RCOP. This entails modifications in a conventional MS.

FIG. 4 shows a mobile station MS and data terminal equipment DTE connected thereto. The MS 33 comprises a radio unit 36, call control 39, a user interface 40 (e.g. keyboard and display), mobility management 41, radio path management (signalling functions) 42, and a terminal adaptor 37 providing a V.24 interface. The radio unit comprises, e.g., a radio transceiver 44 connected to an antenna 55, and a channel coding and decoding unit 43. By means of a two-way switch unit 38, the unit 43 can be connected either to a telephone unit, comprising, e.g., a speech codec 56 and a telephone receiver 34, or to a terminal adaptor 37.

The terminal adaptor 37 comprises a unit 46 which performs data compression/decompression and adaption for the GSM data connection. The unit 46 is connected to the two-way switch 38 via an I/O circuit 45 and to a data terminal 31 via an I/O circuit 47, which forms the interface 53 (e.g., V.24).

Another alternative is to dispose the compression/decompression function between the application program and the serial interface as shown in FIG. 3B. In this case, the MS does not have to be modified.

Figure 5:
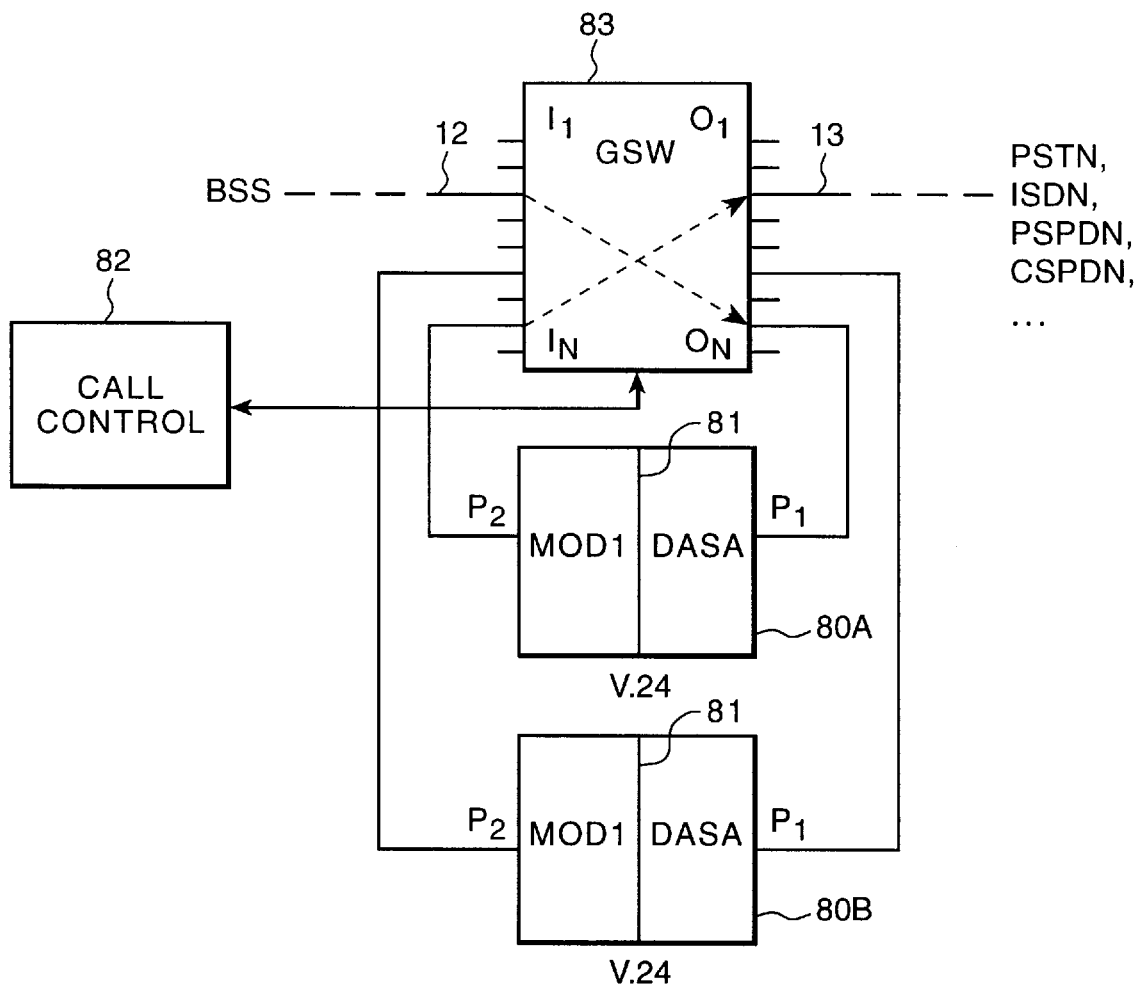
FIG. 5 is a block diagram which illustrates a mobile exchange implemented according to the invention.

FIG. 5 illustrates one way of applying the invention to a mobile exchange MSC. For the sake of clarity, FIG. 5 shows only the switching field 83 and call control 82 included in the exchange, but in practice an MSC contains a large number of various devices. The switching field may be an analog or digital switching device which selectively connects speech and data connections between transmission lines 12 from the base station system BSS and transmission lines 13 from a mobile exchange. An example of such digital telephone exchanges is Telenokia DX 220 MSC.

A network adaptor 80A (IWF) is connected in parallel with the switching field 83 by connecting a signal port P1 to the port $O_{n-1}$ of the switching field 83, and a signal port P2 to the port $I_{N-1}$ on the opposite side of the switching field 83. Another network adaptor 80B (or more) can be connected correspondingly in parallel with the switching field 83. The network adaptor 80 comprises a data transmission service adaptor DASA close to the port P1, said the adaptor adapting the GSM data connection to the V.24 interface 81. The control interface of a data modem MOD1 is connected to the V.24 interface 81, and the line or modem interface is connected to the port P2.

In the following, the operation of the data transmission arrangement according to the invention will be described so that mobile originated and mobile terminated calls will be dealt with separately.

As a special modem is required in the network terminating unit IWF when the compression arrangement of the invention is used, the MS must, in the case of a mobile originated call, in some way uniquely address this modem.

One solution is to reserve a specific telephone number for the compressed connection. In this case, the MSC routes the calls made to this number automatically to the special modem MOD1 of the network terminating unit 80A. When the MS is connected to the modem MOD1 via the switching field 83, the MS dials the number of the remote terminal equipment B with an AT command, as a result of which the MOD1 performs corresponding dialling towards its modem interface.

Another possibility of implementing the addressing of the modem MOD1 is to use the Bearer Capability element of a call set-up message in a nonstandard way. A simple way, and also the most natural one, is to set the modem type field of this message element to a value which is normally not in use while the other fields of the Bearer Capability element are set as for a normal 9600 bit/s asynchronous call. Five bits are reserved or this field, but only the first nine values are currently in use. The remaining 23 values are defined as "reserved". If it is assumed that these "reserved" values are intended for new modem standards and that they are used in numerical order (as they have been used so far), the last value (31) can be used safely for addressing the modem according to the invention. Thus, when the modem field is set to 31 in a call set-up message, the MSC knows that a data call according to the invention is requested and connects the call to the special modem according to the invention.

In the case of mobile-terminated calls, it is also possible to use a specific service number; a data connection can be established through the special modem of the invention by dialling this number. Alternatively, in the case of an incoming call to the GSM system, the modem type field of the Bearer Capability element can be used for addressing the modem, whereby the situation is the same as in a normal data call: the MSC does not know how to set the Bearer Capability element in the call set-up message unless the subscriber has a separate telephone number for data calls. The MS must therefore send the Bearer Capability element to the MSC in a call confirm message. The element indicates that the MS is set to the data mode with modem type value 31.

At the beginning of a data call, the modem MOD1 of the network terminating unit 80A performs handshaking and the V.42 detection and negotiation steps over the modem connection in compliance with the recommendations. Compression parameters according to Table 1 are stored in the modem MOD1. The modem MOD1 negotiates about these parameters with the remote modem MOD2 by means of handshaking. The resulting compression parameters are transmitted to the radio terminal equipment A.

TABLE 1

| Parameter | Length (bytes) | Value (decimal) | Description |
| --- | --- | --- | --- |
| P0 | 1 | 3 | Data compression requested in both directions |
| P1 | 2 | 512 | Number of code words |
| P2 | 1 | 6 | Maximum string length |

The attached figures and the associated description are intended merely to illustrate the present invention. The details of the invention may vary within the scope and spirit of the attached claims.

To the extent that this document refers to a standard, such as CCITT Recommendation V.42bis, the wording of which may be subject to change, the version cited is the one in effect as of Aug. 17, 1992.

We claim:

1. A communication system including a digital cellular radio network, comprising:

a radio data terminal;

a network terminating unit connected to a mobile exchange and comprising a data modem equipped for using an error correction protocol;

a remote data modem equipped for using an error correction protocol; and call control means for establishing a digital transmission connection between the radio data terminal and the data modem and a modem connection between the data modem and the remote data modem;

the radio data terminal and the remote data modem including respective means for transmitting data in a compressed form as compressed data;

the digital transmission connection between the radio data terminal and the data modem being a non-transparent asynchronous data connection of a cellular radio system having an error correction protocol, over which connection said compressed data is transmitted using said error correction protocol of said cellular radio system; and the data modem of the network terminating unit including means for transmitting compressed data over said modem connection by using the error correction protocol of the remote data modem, and means for transmitting compression parameters to the radio data terminal at the beginning of a data session, said parameters being determined on the basis of a handshaking procedure between the data modem and the remote data modem.

2. The communication system of claim 1, wherein:
the radio data terminal comprises radio terminal equipment having an asynchronous data interface to which data terminal equipment is connected.

3. The communication system of claim 2, wherein:
compressing and decompressing means are disposed in said data terminal equipment for compressing and decompressing said data.

4. The communication system of claim 1, wherein:
said means for transmitting data in a compressed form and said means for transmitting compressed data are constituted by respective means for transmitting data compressed in compliance with CCITT Recommendation V.42bis.

5. The communication system of claim 1, wherein:
said error correction protocol of said data modem is in compliance with CCITT Recommendation V.42.

6. The communication system of claim 2, wherein:
said radio terminal equipment is a mobile phone and said data terminal equipment is a computer.

7. The communication system of claim 3, wherein:
said data compressing and decompressing means are arranged to compress and decompress said data in compliance with CCITT Recommendation V.42bis.

8. The communication system of claim 2, wherein:
said error correction protocol of said data modem is in compliance with CCITT Recommendation V.42.

9. The communication system of claim 3, wherein:
said error correction protocol of said data modem is in compliance with CCITT Recommendation V.42.

10. A method for data transmission in a data session in a communication system including a digital cellular radio network, comprising steps of:
establishing a digital data transmission connection between a calling radio data terminal and a data modem in a network terminating unit connected to a mobile exchange;
transmitting a command including telephone number of a called remote data modem from said calling radio data terminal to said data modem in said network terminating unit;
responding to said command in said data modem by establishing a modem connection between said data modem and said remote data modem;
determining compression parameters for said data session by a handshaking procedure between said data modem and said remote data modem;
transmitting said compression parameters from said data modem to said calling radio data terminal;
transmitting data in a compressed form over said digital data transmission connection using an error correction protocol of the cellular radio network; and
transmitting data in said compressed form over said modem connection using as error correction protocols in both said data modem and said remote modem said error correction protocol of said remote modem.

11. A method for data transmission in a data session in a communication system including a digital cellular radio network, comprising steps of:
establishing a digital data transmission connection between a calling radio data terminal and a data modem in a network terminating unit connected to a mobile exchange;
transmitting a telephone number of a remote data modem, which has an error correction protocol with an AT command from said calling radio data terminal to said data modem in said network terminating unit;
responding to said command in said data modem by establishing a modem connection between said data modem and said remote data modem;
determining compression parameters for said data session by a handshaking procedure between said data modem and said remote data modem;
transmitting said compression parameters from said data modem to said calling radio data terminal;
transmitting data in a compressed form over said digital data transmission connection using an error correction protocol of the cellular radio network; and
transmitting data in said compressed form over said modem connection using as error correction protocols in both said data modem and said remote modem said error correction protocol of said remote data modem.

12. A communication system including a digital cellular radio network, comprising:
a radio data terminal;
a mobile exchange;
a network terminating unit connected to said mobile exchange;
a data modem in said network terminating unit;
a remote data modem having a telephone number;
call control means for establishing a digital data transmission connection between said radio data terminal when said radio data terminal is a calling radio data terminal, and said data modem in said network terminating unit;
said calling radio data terminal being capable of transmitting a command including said telephone number of said remote data modem to said data modem in said network terminating unit;
said data modem in said network terminating unit being responsive to said command in said data modem for establishing a modem connection between said data modem and said remote data modem;
said data modem in said network terminating unit and said remote data modem being adapted to determine compression parameters for a data session by a handshaking procedure between said data modem and said remote data modem;
said data modem in said network terminating unit being adapted to transmit said compression parameters to said calling radio data terminal;
said system being arranged for transmitting data in a compressed form over said digital data transmission connection using an error correction protocol of the cellular radio network; and
said system being arranged for transmitting data in said compressed form over said modem connection using an error correction protocol of said remote data modem.

13. A communication system including a digital cellular radio network, comprising:
a radio data terminal;
a mobile exchange;
a network terminating unit connected to said mobile exchange;
a data modem in said network terminating unit;
a remote data modem having a telephone number;

call control means for establishing a digital data transmission connection between said radio data terminal when said radio data terminal is a calling radio data terminal, and said data modem in said network terminating unit;

said calling radio data terminal being capable of transmitting said telephone number of said remote data modem with an AT command to said data modem in said network terminating unit;

said data modem in said network terminating unit being responsive to said AT command in said data modem for establishing a modem connection between said data modem and said remote data modem;

said data modem in said network terminating unit and said remote data modem being adapted to determine compression parameters for a data session by a handshaking procedure between said data modem and said remote data modem;

said data modem in said network terminating unit being adapted to transmit said compression parameters to said calling radio data terminal;

said system being arranged for transmitting data in a compressed form over said digital data transmission connection using an error correction protocol of the cellular radio network; and said system being arranged for transmitting data in said compressed form over said modem connection using an error correction protocol of said remote data modem.

14. A method for data transmission in communication system including a digital cellular radio network, comprising steps of:

establishing a digital data transmission connection between a radio data terminal and a data modem in a network terminating unit connected to a mobile exchange;

establishing a modem connection between said data modem in said network terminating unit and a remote data modem;

determining compression parameters for a data session by a handshaking procedure between said data modem and said remote data modem;

transmitting said compression parameters from said data modem to said radio data terminal;

transmitting data in a compressed form over said digital data transmission connection using an error correction protocol of said cellular radio network; and transmitting data in said compressed form over said modem connection using an error correction protocol of said remote data modem.

15. A communication system including a digital cellular radio network, comprising:

a radio data terminal;

a mobile exchange;

a network terminating unit connected to said mobile exchange;

a data modem in said network terminating unit;

call control means for establishing a digital data transmission connection between a radio data terminal and said data modem in said network terminating unit;

said data modem in said network terminating unit being capable of establishing a modem connection between said data modem and a remote data modem;

said data modem in said network terminating unit and said remote data modem being adapted to determine compression parameters for a data session by a handshaking procedure between said data modem and said remote data modem;

said data modem in said network terminating unit being adapted to transmit said compression parameters to said calling radio data terminal;

said system being arranged for transmitting data in a compressed form over said digital data transmission connection using an error correction protocol of said cellular radio network; and said system being arranged for transmitting data in said compressed form over said modem connection using an error correction protocol of said remote data modem.

* * * * *